United States Patent
Wageneck

(10) Patent No.: US 6,879,818 B2
(45) Date of Patent: Apr. 12, 2005

(54) SHOWER HEAD RADIO

(76) Inventor: Russell E. Wageneck, 5622 Evers Rd., Apt. 3407(Bexar Cty), San Antonio, TX (US) 78238-1760

( * ) Notice: Subject to any disclaimer, the term of this patent is extended or adjusted under 35 U.S.C. 154(b) by 103 days.

(21) Appl. No.: 10/144,616

(22) Filed: May 13, 2002

(65) Prior Publication Data

US 2003/0211838 A1 Nov. 13, 2003

(51) Int. Cl.[7] .............................................. H04B 1/06
(52) U.S. Cl. .................. 455/344; 455/90.3; 455/556.1; 4/597; 4/605
(58) Field of Search ................................ 455/344, 347, 455/350, 90.3, 556.1, 557, 575.1; 4/597, 601, 605; 222/181, 192; 239/383, 446, 449; 322/35

(56) References Cited

U.S. PATENT DOCUMENTS

| 4,880,145 A | * | 11/1989 | McManus | 222/192 |
| 4,964,181 A | * | 10/1990 | Alpert | 4/597 |
| 5,073,996 A | * | 12/1991 | Schinle | 4/601 |
| 5,140,254 A | * | 8/1992 | Katzman | 322/35 |
| 5,329,650 A | * | 7/1994 | Zaccai et al. | 4/605 |
| 5,499,767 A | * | 3/1996 | Morand | 239/383 |

FOREIGN PATENT DOCUMENTS

| DE | 2426861 | 12/1975 | 322/35 |

* cited by examiner

*Primary Examiner*—Quochien B. Vuong

(57) ABSTRACT

A shower head (8) with a waterproof enclosure (20) encloses a radio audio source (28), the accessory, and a replaceable battery(s) (26). A detachable handle (22) is affixed to one side of a shower head (8) as a leveraged source for positioning a shower head (8). A slidably removable waterproof battery(s) cover (24) is for a replaceable battery(s) (26) placement. A waterproof radio speaker (16), a waterproof on-off radio volume control (10), and a waterproof radio tuner control (14) known as the accessory are disposed within a waterproof enclosure (20) and located to facilitate an improved reception of the audio sound quality and the manual-automatic radio power control. This enclosed accessory with a radio audio source (28) and a replaceable battery(s) (26) further facilitates space saving, an improved audio accessibility, and an ease of operation and control of the shower head radio.

6 Claims, 1 Drawing Sheet

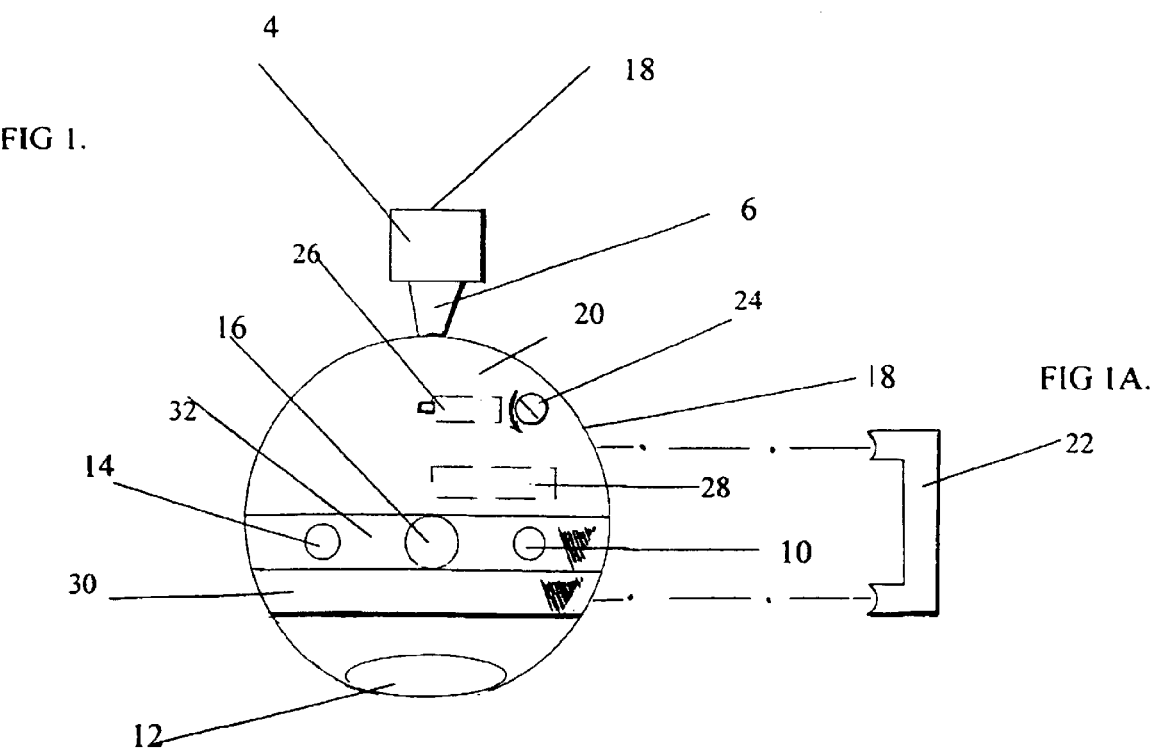
FIG 1.
FIG 1A.
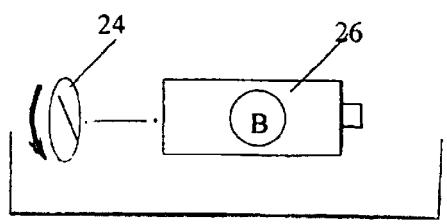
FIG 1B.

SHOWER HEAD RADIO

FEDERALLY SPONSORED RESEARCH

Not Applicable

SEQUENCE LISTING

Not Applicable

BACKGROUND-FIELD OF INVENTION

This invention relates to a shower accessory, specifically a shower head with an enclosed radio for use in a shower environment.

BACKGROUND-DESCRIPTION OF PRIOR ART

Stores typically market and sell shower heads of various designs and sizes for the purpose of providing the public needs. These shower heads though functional for taking a shower do not contain a radio audio source. Manufacturers provide a large selection of radios that are designed to be used within a shower environment. These radios typically have a waterproof design and are battery powered. Typically, the radio is hung from a hook mounted on the shower wall by a suction cup, adhesive or the like. One disadvantage of these previously known radios, is that a suction cup, adhesive or the like which secure the radio to the wall becomes undone. When this happens, the radio falls to the floor at the bottom of the shower which damages the radio.

A further disadvantage of these previously known shower radios is that they are typically located either behind a noisey and distracting shower water source as well as in other locations within the shower environment making for a poor quality sound reception. An additional disadvantage of these previously known radios is their locations behind the noisey shower source, or the like. This makes a accessibility and ease of operation of these radios the more difficult.

U.S. Pat. No. 5,140,254 to Katzman (1992) discloses an accessory for a shower using an empeller and a generator as a preferred means for electrically powering a radio. Hot oil filled tube(s) used to simulate a Wurlitzer record player are also found within this device. This device with its rather large size and appearance has no apparent readily accessible means for conveniently and effectively re-positioning and directing a accessory's audio source and shower water source as may be required by the shower user. Further, the relatively large size to accomodate a simulated Wurlitzer record player with its alternative power resources is less space saving in a generally space limited shower environment.

A further U.S. Pat. No. 4,964,181 to Alpert (1990) discloses a shower head attachment with spaced pulsating shower heads for the delivery of pulses at spaced locations to a user's body. A waterproof cassette tape deck is located externally and between the shower heads. A disadvantage of the combined shower heads with an externally located radio tape deck is that it takes up space and is therefore not space saving within a generally space limited shower environment.

OBJECTS AND ADVANTAGES

Accordingly several objects and advantages of my invention are:

(a) To provide the shower head with a combined radio audio source enclosed within the shower head that is space saving in comparison with other shower radios generally located elsewhere within the shower environment.

(b) To provide the shower head with the combined radio audio source positioned above the noisey and very distracting shower water source in comparison with other shower radios located elsewhere within the shower environment.

(c) To provide the shower head with the combined radio audio source located centrally and proximately in front of the user in comparison with other shower radios located elsewhere within the shower environment.

(d) To provide the shower head with the combined radio audio source centrally and proximately located above the noisey and distracting shower water source facilitating an improved reception of both quality and quantity of an audio sound source. This compares with other shower radios located elsewhere In the shower environment.

(e) To provide the shower head with the combined radio audio source located centrally and proximately in front of the shower user to facilitate a stereo sound effect. This effect is facilitated when both ears equally receive an audio sound source. This compares with with a more monaural sound effect received with other shower radio's placed elsewhere within the shower environment.

(f) To provide the shower head with the combined radio audio source with controls located centrally and proximately above the shower water source for an improved accessibility to and ease of operation of the radio controls in comparison with other shower radios located elsewhere within the shower environment.

(g) To provide a detachable handle located on one side of a shower head for a leveraged positioning of the shower head and shower water source. This leveraged handle is further very helpful to the elderly and those disabled with arthritis as an assistive tool to more easily move the shower head into a desirable position.

(h) to provide an enclosed radio source surrounded by the shower head to more effectively and efficiently facilitate an improved integral attachment of the shower head with the enclosed radio source to the shower head's water outlet. This integral shower head radio attachment is an improvement over other shower radio attachments located elsewhere in the shower environment.

(i) To provide a manual-automatic on-off radio volume control as a feature to control either manually a battery power source, or to automatically control a power source by use of but not limited to a ceramic picio-electric vibration switch to sence a shower head's water flow vibrations. This automatic feature only allows the radio audio source to be activated when the shower is turned on saving both shower user's time to manually control the shower radio and battery replacement costs by ensuring the shower head radio is only operational when the shower is in use.

SUMMARY

In accordance with the present invention ,the shower head with the enclosed radio audio source located above a noisey shower water source with the manual-automatic on-off radio volume control and the detachable handle provides an improved user reception of audio sound quality, is space saving with an easier accessibility to and an improved operation of the shower head's radio controls, as well as an enhanced shower head's leveraged manuverability.

DRAWING FIGURES

FIG. 1 shows a perspective view of the shower head inclusive of all embodiments of this invention.

FIG. 1A shows an exploded view of the detachable handle to the shower head.

FIG. 1B shows an exploded view of the battery(s) power source with the slidably protective cover.

Reference Numerals in Drawings 4. shower head water connection
6. shower head swivel device
8. shower head
10. waterproof on-off radio volume control
12. shower water outlet screen
14. waterproof radio tuner control
16. waterproof radio speaker
18. shower water source inlet
20. waterproof enclosure
22. detachable handle
24. slidably removable waterproof battery(s) cover
26. replaceable battery(s)
28. radio audo source
30. first surface
32. Second surface Conclusions, Ramification, and Scope Thus the reader will see that the shower head radio of this invention provides the self contained shower head and radio with an improved reception of audio sound quality, an improved accessibility to and easier operation of the radio controls, is space saving with an improved manual-automatic on-off volume control function, as well as much easier to manuever. While the above description contains many specifications, these should not be contrued as limitations on the scope of the invention, but rather as an exemplification of one preferred embodiment thereof. Many other variations are possible as the size, shape, color, as well as the location and number of component parts embodied in this invention.

These variations, however, are not considered of enough importance to include within the ramifications in the drawing. Accordingly, the scope of the invention should be determined not by the embodiment(s) illustrated, but by appended claims and their legal equivalents.

DETAILED DESCRIPTION

Description- FIGS. 1, 1A, and 1B - Preferred Embodiment.

A preferred embodiment of the shower head radio of the present invention is illustrated in FIG. 1's perspective view along with FIGS. 1A and FIG. 1B's exploded views. A shower head (8) with a shower water source inlet (18) and a shower head water connection (4) is connected to a shower outlet.

A shower head swivel device (6) is attached in between a shower head water connection (4) and a shower head (8).

A shower head (8) materials in the preferred embodiment are of a hard-molded plastic. However, this material can be made of any other material that is suitable for a shower head (8)'s integral construction.

The front of a shower head (8) consists of an approximately 6 cm. shower water outlet screen (12) made in the preferred embodiment of the hard molded plastic. However, this material can be made of any material with a size suitable for a shower water outlet screen (12).

In the preferred embodiment, a top front of an otherwise spherically shaped shower head (8) has two surfaces. A first surface (30) is approximately 1 cm. above and 1 cm. rearward of the shower water outlet screen (12). A first surface (30) extends backward approximately 3 m. from this screen at a 90 degree angle to this screen.

A second surface (32) is positioned at a 90 degree angle from first surface (30 and extends vertically upward approximately 6 cm and then gradually slants downward maintaining a spherical shape to the rear of a shower head (8). A second surface (32) encloses three radio components known as an accessory. One radio component a spherically shaped waterproof on-off radio volume control (10) is located approximately 2 cm. from the top border and 2 cm. from the right front border of the second surface (32). A second radio component is also located on the second surface approximately 2 cm. from the top of the second surface border and 2 cm. from the left border of a water proof on-off radio volume control (10). This accessory is a waterproof radio speaker (16) of approximately 4 cm. in diameter and is also spherically shaped. A third radio component is also a spherically shaped waterproof radio tuner control (14) located approximately 2 cm. from the top border of a second surface (32) and is approximately 2 cm. from left border of a waterproof radio speaker (16).

In the preferred embodiment, a detachable handle (12) is located on one side of the shower head (8). This handle attaches in a preferred vertical plane to a shower head (8) and is approximately 7 cm. in length and 2 cm. in width.

Preferably located in the embodiment aproximately 2 cm. from the right and rear top borders of the shower head surface is a spherical slidably removable waterproof battery (s) cover (24), 2 cm. in diameter.

Enclosed within a waterproof enclosure (20) of a shower head (8) and approximately 2 cm. in back of a second surface (32) containing the three radio accessories are two more radio components. These components are a radio audio source (28) and a replaceable battery(s) (26). The preferred embodiment is that these components may extend to the inner borders of a shower head (8) within a waterproof enclosure (20) of a shower head (8). The dimensions of a waterproof enclosure (20) are approximately 6 cm in length, 10 cm, in width, with a depth of approximately 6 cm. at the second surface gradually decreasing as a waterproof enclosure (20) slants and projects rearward to the back of a shower head (8). Therefore, in this embodiment the overall diameter of a shower head (8) proper is approximately 10 cm.

The preferred embodiments listed are only approximation of size, materials, components, and location of component, and may be changed as required to meet the scope of this invention.

Operation- FIGS. 1, 1A, 1B

The manner of using a shower head (8) with a radio audio source (28) enclosed, along with the radio accessory components, is not functionally different from a conventional shower head and a conventional radio with the exception of a waterproof on-off radio volume control (10) to manually or automatically control the radio power source and a detachable handle (22) to improve the shower head positioning. A radio audio source (28) with the radio accessory components exclusive of a waterproof on off radio volume control (10) with the manual-automatic power control feature are used in a conventional way as as one would use a radio audio source (28) of similar embodiments. The function of a detachable handle (22) is to provide a convenient and leveraged source to grasp and is used to implement a turning and a rotation of a shower head (8) on a shower head swivel device (6). A slidably removable waterproof battery(s) cover (24) provides a user accessible waterproof cover over a replaceble battery(s) (26). The cover is removable by a slidable rotation of the cover from a shower head (8). A replaceable battery(s) (26) purpose is conventional for providing power to a radio audio source (28) and the accessory components. A shower head (8) with the exception of the enclosed radio audio source and the accessory components to include the manual-automatic power control function, and a detachable handle (22) function in a conventional manner as found in other shower head prior art.

What is claimed is:

1. A shower unit comprising (a) a shower head, (b) a radio unit, (c) a power source, (d) an attachment, and (e) an accessory powered by said power source, wherein said accessory includes a waterproof on-off radio volume control, one or more waterproof radio speaker(s), and a waterproof radio tuner control disposed centrally above and proximately behind a shower water outlet screen, wherein said waterproof on-off radio volume control is a manual-automatic switch means for selection of manual-automatic on-off power control of said power source, and wherein said waterproof on-off radio volume control includes an electro-mechanical on-off manual-automatic power switch comprising a vibration sensor for sensing the on-off state of a shower water source for the automatic on-off control of said power source, said manual-automatic switch means turning on said radio unit only when said vibration sensor senses the on state of the shower water source and when said electromechanical on-off manual-automatic power switch is on automatic.

2. The shower unit of claim 1 wherein said shower head includes an essential spherically shaped contiguously molded plastic housing substantially 10 centimeters in diameter, wherein said power source is a battery(s) power source, said attachment is a detachable handle, and said accessory is a radio accessory to also include a waterproof enclosure within a confines of said shower head surrounding said radio unit, said battery(s) power source, and said radio accessory, and wherein said radio accessory includes said waterproof on-off radio volume control to also include said manual-automatic switch means for said vibration sensor for sensing the on-off state of the shower water source to automatically control the on-off power of said battery(s) power source to more efficiently conserve said battery(s) power source and effectively control said radio unit.

3. The shower unit of claim 2, wherein said radio unit enclosed within said shower head includes an Amplitude Modulated and a Frequency Modulated radio audio source with said battery(s) power source, to include said radio accessory wherein said radio accessory includes said waterproof radio tuner control, said waterproof radio speakers(s), and said waterproof on-off radio volume control for a shower user to select head's water source and to also select the enclosed Amplitude Modulated or Frequency Modulated radio audio source.

4. The shower unit of claim 2, wherein said battery(s) power source enclosed within said shower head's waterproof enclosure is a replaceable battery(s) includes one or more AA or AAA battery(s) within a slidably removable waterproof battery(s) cover and an enclosed battery(s) receptacle to include rechargeable battery(s) of one or more means for a secure protected waterproof battery(s) power source and the battery(s) receptacle enclosed within said confines of said shower head.

5. The shower unit of claim 3, wherein said radio accessory enclosed within said shower head's enclosure includes said waterproof on-off radio volume control, said waterproof radio speaker(s), and said waterproof radio tuner control centrally above and proximately behind said shower water outlet screen means for a shower user's immediate accessibility to the waterproof radio audio source and the waterproof radio controls disposed within said shower head.

6. The shower head of claim 1, wherein said attachment is a detachable handle affixed to a right side of said shower head in a predetermined area for a secure and accessible connection of the detachable handle above said shower water outlet screen for providing a shower user an efficient positioning and more leverage rotation of said showerhead on a shower head swivel device of said shower head, whereby said a shower head radio user enjoys an improved space saving, a more accessible and enhanced quality and quantity audio reception, a more accessible and efficient use of the manual-automatic radio control functions, and a more effective and efficient shower head user's leveraged positioning of said shower head radio.

* * * * *